(12) United States Patent
Schimmel

(10) Patent No.: US 6,496,909 B1
(45) Date of Patent: Dec. 17, 2002

(54) METHOD FOR MANAGING CONCURRENT ACCESS TO VIRTUAL MEMORY DATA STRUCTURES

(75) Inventor: Curt F. Schimmel, San Ramon, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/287,592

(22) Filed: Apr. 6, 1999

(51) Int. Cl.[7] ........................ G06F 12/14; G06F 12/00
(52) U.S. Cl. .................. 711/163; 711/152; 711/207; 711/210; 710/200
(58) Field of Search ................ 711/141, 206, 711/207, 163, 145, 152, 209, 210; 710/200

(56) References Cited

U.S. PATENT DOCUMENTS 5,339,397 A * 8/1994 Eikill et al. ............... 711/206
5,649,139 A * 7/1997 Weinreb et al. ........... 711/202
5,983,329 A * 11/1999 Thaler et al. .............. 711/163
6,085,296 A * 7/2000 Karkhanis et al. ......... 711/147

* cited by examiner

Primary Examiner—Matthew Kim
Assistant Examiner—Matthew D. Anderson
(74) Attorney, Agent, or Firm—Schwegman, Lundberg, Woessner & Kluth, P.A.

(57) ABSTRACT

In a method for providing concurrent access to virtual memory data structures, a lock bit for locking a virtual page data structure is provided in a page table entry of a page table. The page table is configured to map virtual pages to physical pages. Then, a first thread specifying an operation on the virtual page data structure is received. The first thread is provided exclusive access to the virtual page data structure by setting the lock bit in the page table entry such that other threads are prevented from accessing the virtual page data structure. A wait bit also may be provided in the page table entry to indicate that one or more of the other threads are in a wait queue when the first thread has exclusive access to the data structure. When the first thread no longer needs exclusive access to the data structure, a second thread is selected from among the other threads and is provided with exclusive access to the data structure.

24 Claims, 7 Drawing Sheets

METHOD FOR MANAGING CONCURRENT ACCESS TO VIRTUAL MEMORY DATA STRUCTURES

BACKGROUND OF THE INVENTION

1. Field of the Invention

This invention relates generally to memory management in computer systems and, more particularly, to methods for managing concurrent access to virtual memory data if structures.

2. Description of the Related Art

Modern computer systems employ operating systems to manage the computer systems' resources and provide a foundation for application programs running on the computer systems. Some of the popular operating systems include DOS, Microsoft Windows®, Microsoft Windows NT®, Microsoft Windows 98™, UNIX, and LINUX™. The operating system provides a base for writing and running application programs thereby freeing programmers from the details of computer system hardware. In addition, the operating system manages processes, memory, file systems, I/O systems, and the like.

In an operating system, a process refers to a running program with input, output, and a state. For example, a process includes the current values of the program counter, the registers, and the variables of an executing program. Each process has a thread, which is associated with an address space. The thread is sometimes referred to as a lightweight process. Processes and threads are well known in the art and are described, for example, in Modern Operating Systems, Andrew S. Tannenbaum, (1992). Hence, running a process generally requires executing a thread by accessing the address space.

The operation of accessing an address space typically involves managing a memory system in the operating system. In particular, the operating system implements a virtual memory system to map a virtual address associated with a thread from a large virtual address space to a physical address of a physical memory, which is typically a RAM. A computer system is not limited to a single virtual address space. Indeed, it may implement as many virtual address spaces as its operating system is capable of supporting. For example, modern operating systems often support multiple processors and multiple threads of execution, thereby allowing the sharing of the system resources and further providing multiple concurrent processes and threads that execute simultaneously.

FIG. 1A illustrates an exemplary conventional memory mapping method for mapping one or more virtual address spaces to a physical memory. A plurality of virtual address spaces 102 (VAS0), 104 (VAS1), and 106 (VASN) are provided. Each of the virtual address spaces 102, 104, and 106 is provided with a page table for mapping. Specifically, the virtual address spaces 102, 104, and 106 are associated with page tables 110, 112, and 114, respectively. Each of the virtual address spaces has a plurality of virtual pages 116. A physical memory 108 also includes a plurality of physical pages 118. The virtual pages 116 and physical pages 118 are typically of same size and typically range from 4 kilobytes (KB) up to 16 KB. Nevertheless, computer systems may employ any suitable page size, which can be selected by the operating system based on supporting hardware.

In this configuration, pages in the virtual address spaces 102, 104, and 106 are mapped to pages in the physical memory 108 via page tables 110, 112, and 114, respectively. For example, a virtual page 120 in the virtual address space 102 is mapped via page table 110 to physical page 126. Likewise, a virtual page 122 in the virtual address space 104 is mapped to physical page 128 through page table 112 while virtual page 124 of the virtual address space 106 is mapped to physical page 130 via page table 114. In those instances where a page is not present in the physical memory, a page fault is generated to load the page from a secondary storage device such as a hard drive, optical drive, tape drive, etc. Page mapping and page faults are well known in the art. It should be noted that page tables may be shared among several virtual address spaces. Indeed, even a portion of a page table may be shared among different address spaces.

A virtual address space, in abstract terms, is typically divided into a plurality of regions in accordance with data types. FIG. 1B shows a more detailed diagram of the exemplary virtual address space 102. The virtual address space 102 is comprised of a plurality of regions 130, 132, 134, 136, 138, and 140. Each of the regions 130 through 140 is a contiguous region and the virtual pages within each region share common attributes. For example, the regions 130, 134, and 138 are empty regions that can be used to accommodate new data (e.g., files) from a secondary storage device or data from other contiguous regions 132, 136, and 140. The code region 132 corresponds to the address space of codes (e.g., text in Unix) such as programs, instructions, and the like. On the other hand, the data region 136 includes a pair of sub-regions 142 and 144 that corresponds to address spaces of data and uninitialized data (e.g., HEAP), respectively. Likewise, the stack region 140 corresponds to the address space of a stack. The operating system maintains attributes such as the start address and the length of each region so that each region can be tracked accurately.

As mentioned above, the virtual pages in each region share common attributes. For example, the code region 132 may have an attribute specifying a file on a hard drive from which instructions can be fetched. The stack region 140, on the other hand, usually grows dynamically and automatically downwards toward lower addresses and has an attribute that identifies it as a stack. Other common attributes include read and write attributes. For instance, the code region 132 is generally given an attribute of read only while data is associated with both read and write attributes. Other attributes also may be applied to any of the regions in a virtual address space.

In modern computer systems, operating systems generally allow multiple threads to execute virtually simultaneously in the virtual address space 102. For example, UNIX and LINUX™ operating systems allow multiple threads to concurrently execute in a single virtual address space. In such instances, the threads may be performing an operation that affects the address space at once. For example, multiple threads on multiple CPUs could simultaneously perform page faults. Multiple threads may also execute a system call (e.g., MMAP in Unix) to map a file from a secondary storage device into the address space. To accommodate the new file, the operating system may create a region in one of the empty regions 130, 134, or 138 of the virtual address space 102.

However, when multiple threads are attempting to access the same region in a virtual address space, a problem of contention arises. For example, if two threads are allowed to operate on the kernel data associated with the same virtual page in a region, the data may not be synchronized or updated properly. To address the contention problem, conventional techniques have used a "lock" to synchronize access by providing exclusive access to a thread such that other threads are not allowed to change the data accessed by the thread. In this manner, the lock ensures mutual exclusion of multiple threads for updates.

Conventional methods typically have provided a lock for each region in a virtual address space. The virtual memory system portion of the operating system generally maintains the regions of a virtual address space as a data structure, which is kept in a memory. FIG. 1C shows a simplified data structure 150 using locks 162, 164, and 166 to provide exclusive access to regions 152, 154, and 156, respectively. The regions 152, 154, and 156 may correspond to a code region, data region, and stack region, respectively, and may be shared among different address spaces. It is noted that the word region is used herein in its most general form. In fact, it may actually be composed of multiple data structures within the kernel. The data structure 150 also includes an address space 158 that heads the virtual address space and maintains a pointer to the first region 152. In addition, the address space 158 includes a pointer to a page table 160 associated with the data structure 150. The data structure 150 may be provided for each virtual address space where the operating system provides multiple virtual address spaces. The data structures for all the virtual address spaces are stored in kernel memory in the operating system.

The regions 152, 154, and 156 are arranged as a linked list where the region 152 points to regions 154, which in turn points to region 156. However, the data structure 150 may be implemented by using any suitable arrangement such as arrays, trees, and the like. Each of regions 152, 154, and 156 is also a data structure and provides a pointer to locations such as files on a disk, flags for read/write permission, a flag for a stack, etc.

The data structures for the regions 152, 154, and 156 include the locks 162, 164, and 166, respectively. The lock 162 is used to provide a thread with exclusive access to the kernel data structures for the pages in the region 152. For example, the lock 162 is obtained and held to enable the thread to perform an operation that affects the kernel data structures corresponding to the virtual addresses in the region 152. When the thread finishes its operation, the lock 162 is released so that another thread can access the data structures. Similarly, the locks 164 and 166 are used to provide exclusive access to the data structures for the pages the regions 154 and 156, respectively. As is well known in the art, the locks 162, 164, and 166 may be implemented using binary semaphore, monitor, etc.

Unfortunately, the conventional method of providing one lock per region to protect against changes to the region data structures has several drawbacks. For example, providing a single lock in a region creates a contention problem and a bottleneck when multiple threads need to perform page faults or make other changes to the state of the pages in the region. In such situations, the threads are typically placed in a queue and executed one after another, thereby causing the bottleneck. The problem is exacerbated in proportion to the scale of a computer system. As an example, a large-scale computer system with dozens or even hundreds of processors may have hundreds of threads competing for the lock to a region, which can be gigabytes in size.

One solution has divided each region into multiple sub-regions, with each sub-region being assigned a lock. Although this solution somewhat improves the performance, it merely provides finer granularity without substantially correcting the fundamental problem stemming from having one lock per region or sub-region. That is, the contention problem will continue to exist for a sub-region having a plurality of pages unless the granularity of each sub-region is equal to the size of a virtual page.

Making the granularity of the sub-regions equal to the size of virtual page, however, leads to other problems. By way of example, a two-gigabyte region of a virtual address space can be split four contiguous sub-regions of 512 megabytes each. Each sub-region will have its own lock. Although four threads may execute concurrently, they must be accessing different sub-regions. In other words, they may not access the data structures for the same sub-region at the same time. Furthermore, splitting a multi-gigabyte region into small pieces would result in a prohibitive number of regions. For instance, using four sub-regions effectively quadruples space and memory overhead to support the sub-regions. Since each region is represented by a data structure, creating multiple sub-regions in place of a single one increases the operating system kernel's memory overhead. Hence, this conventional approach increases both the time and space overhead of the kernel.

These problems are further accentuated in multi-processor computer systems having many processors due to the use of a large number of threads. For example, in distributed shared memory (DSM) systems, providing multiple locks for a region still suffers from the space overhead problem and also suffers from a lack of locality. Furthermore, the conventional methods do not scale easily for various region sizes and require substantial memory spaces to accommodate the data structures.

In view of the foregoing, what is needed is a method for managing concurrent access to virtual memory data structures without the attendant cost in space. What is also needed is a method that can provide locks that are scalable for multi-processor computer systems.

SUMMARY OF THE INVENTION

Broadly speaking, the present invention fills these needs by providing methods for managing concurrent access to the kernel data structures for a virtual page in memory. It should be appreciated that the present invention can be implemented in numerous ways, including as a process, an apparatus, a system, a device, a method, or a computer readable medium. Several inventive embodiments of the present invention are described below.

The present invention provides methods for providing concurrent access to a virtual page data structure in a computer system. A lock bit for locking a virtual page data structure is provided in a page table entry of a page table. The page table is configured to map virtual pages to physical pages. Then, a first thread specifying an operation on the virtual page data structure is received. The first thread is provided exclusive access to the virtual page data structure by setting the lock bit in the page table entry such that other threads are prevented from accessing the virtual page data structure.

Preferably, a wait bit also is provided in the page table entry to indicate that one or more of the other threads are in a wait queue when the first thread has exclusive access to the page. When the first thread no longer needs exclusive access to the page, a second thread is selected from among the other threads and is provided with exclusive access to the page. Alternatively, the waiting threads may be placed in a spin loop to wait for the lock bit to become available. In this case, the wait bit need not be used.

By thus providing a lock in each page table entry, the present invention allows the locks to scale on a one-to-one basis with page table entries and therefore with virtual pages as well. Furthermore, the methods of the present invention employ a single lock bit in each of the existing page table entries, thereby substantially reducing space requirements and eliminating the need for additional data structures. The use of a wait bit in the page table entry facilitates efficient locking when more than one thread is waiting to access a data structure associated with the page table entry. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form part of this specification, illustrate embodiments of the invention and, together with the description, serve to explain the principles of the invention.

DETAILED DESCRIPTION OF THE PREFERRED EMBODIMENTS

Figure 1A:
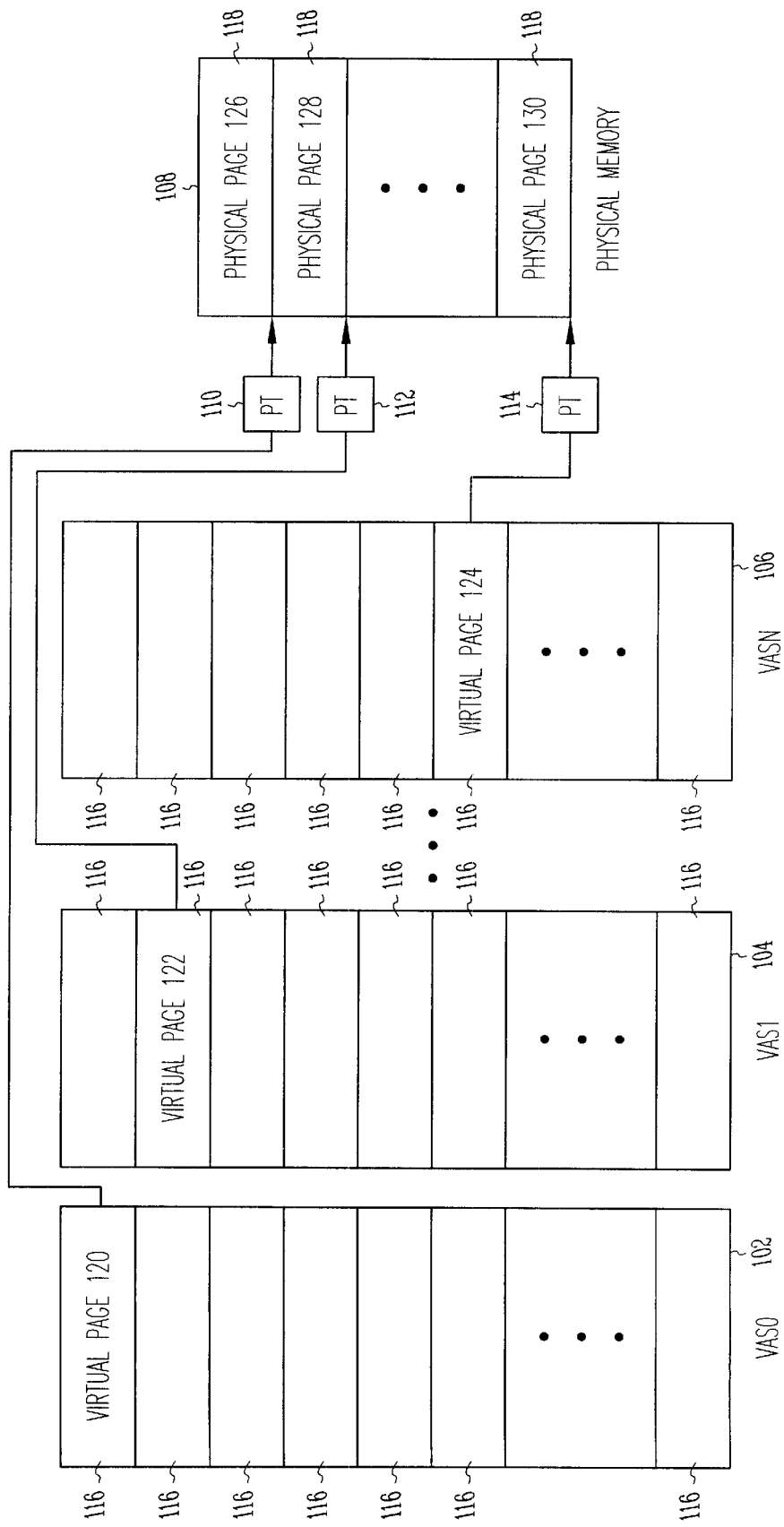
FIG. 1A illustrates an exemplary conventional memory mapping method for mapping one or more virtual address spaces to a physical memory.
Figure 1B:
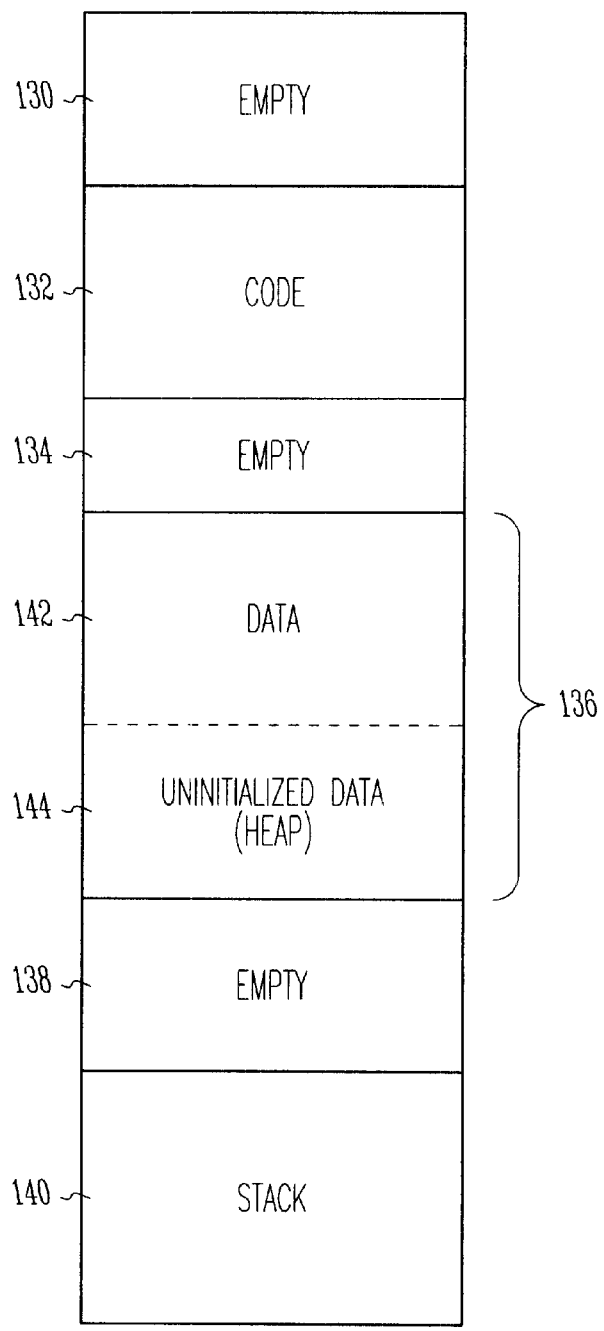
FIG. 1B shows a more detailed diagram of the exemplary virtual address space.
Figure 1C:
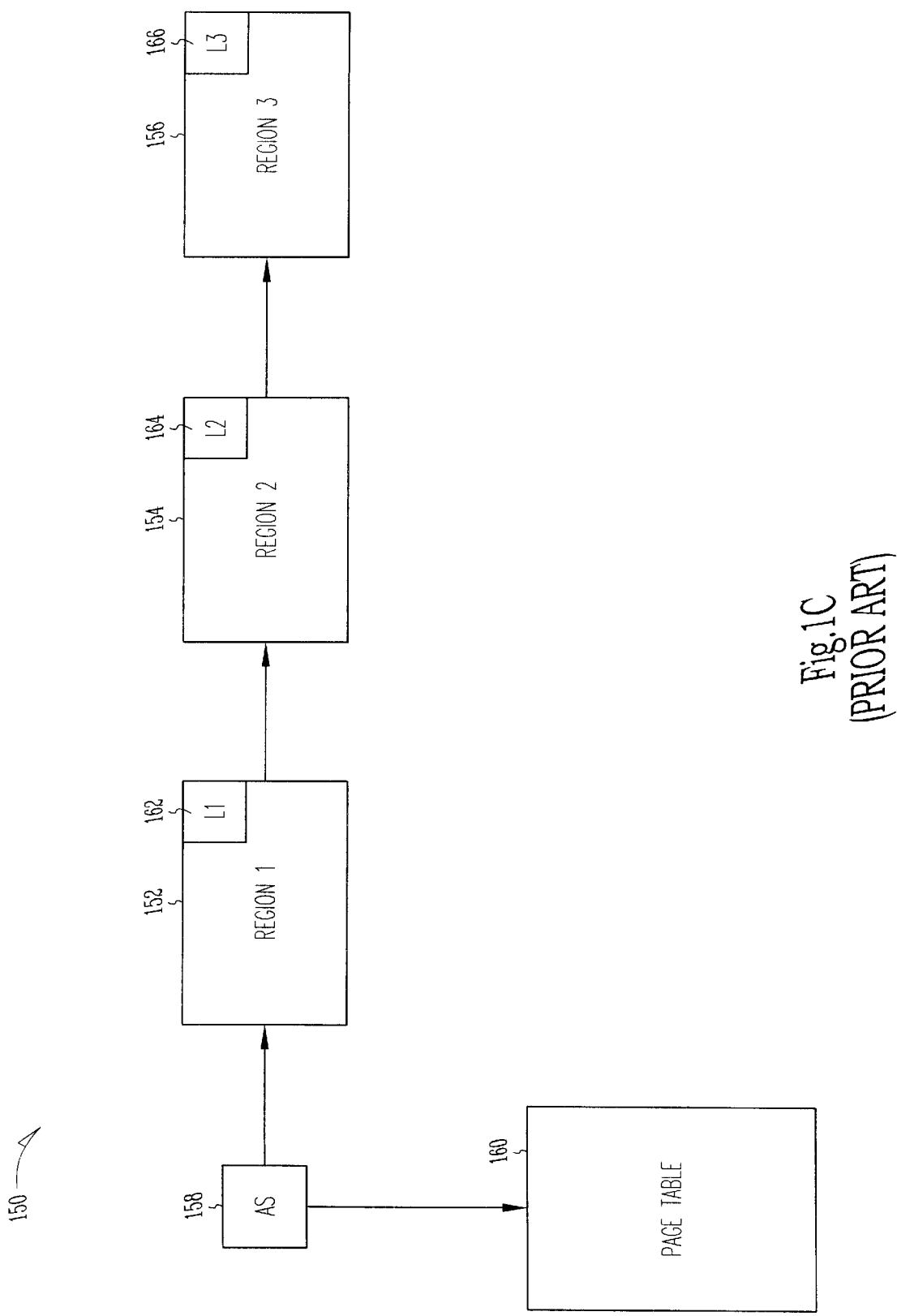
FIG. 1C shows a simplified data structure using locks to provide exclusive access to regions.

An invention is described for methods for managing concurrent access to a virtual page data structure in memory. It will be obvious to one skilled in the art, however, that the present invention may be practiced without some or all of the specific details set forth below. In other instances, well known process operations have not been described in detail to avoid unnecessarily obscuring the present invention.

The present invention provides a lock for each individual virtual page within a virtual address space region. Specifically, each virtual page has its own lock by providing a lock in each page table entry (PTE). Accordingly, the present invention substantially eliminates contention problems caused by multiple threads accessing the same region. Furthermore, providing a lock in each page table entry allows the locks to scale on a one-to-one basis with page table entries. In addition, the methods of the present invention employ a single lock bit in each of the existing page table entries, thereby substantially reducing space requirements.

A virtual memory system in the operating system may contain a plurality of page tables to map each of the virtual address spaces to a physical memory. A page table is provided for each virtual address space to describe the mapping for the associated virtual address space. For example, a page table can be implemented in the virtual memory system as a data structure (e.g., array, linked list) and is used to keep track of page mapping from virtual to physical pages.

The size of the page table is proportional to the associated virtual address space to provide mapping for potentially all possible virtual pages in the virtual address space. In practice, however, the page table is kept at a substantially smaller size than the maximum because only a fraction of the virtual address space is typically used. For example, modern processors (e.g., MIPS™ processors) may support a virtual address space ranging from a gigabyte up to a terabyte. In contrast to the large virtual address space, however, virtual memory systems maintain only a substantially smaller subset of the virtual address space in a page table at a given time in physical memory. Accordingly, the data structure (e.g., array) implementing a page table is generally sparse because only the portions of the virtual address space actually needed are allocated for the page table.

Each page table contains a number of entries each of which is called a "page table entry" (PTE). A page table entry includes a number of bits that is sized in multiples of two, such as 16-bits, 32-bits, 64-bits, etc. For example, in a 32-bit computer system, each page table entry can be 4 bytes or 32 bits in size. For a 64-bit system, PTEs may be 8 bytes or 64 bits in size. In addition, other PTE sizes adapted to the hardware configurations of a computer system may also be used in the present invention. Each page table entry for a virtual page describes the mapping to a physical page, which is often referred to as a page frame.

Figure 2:
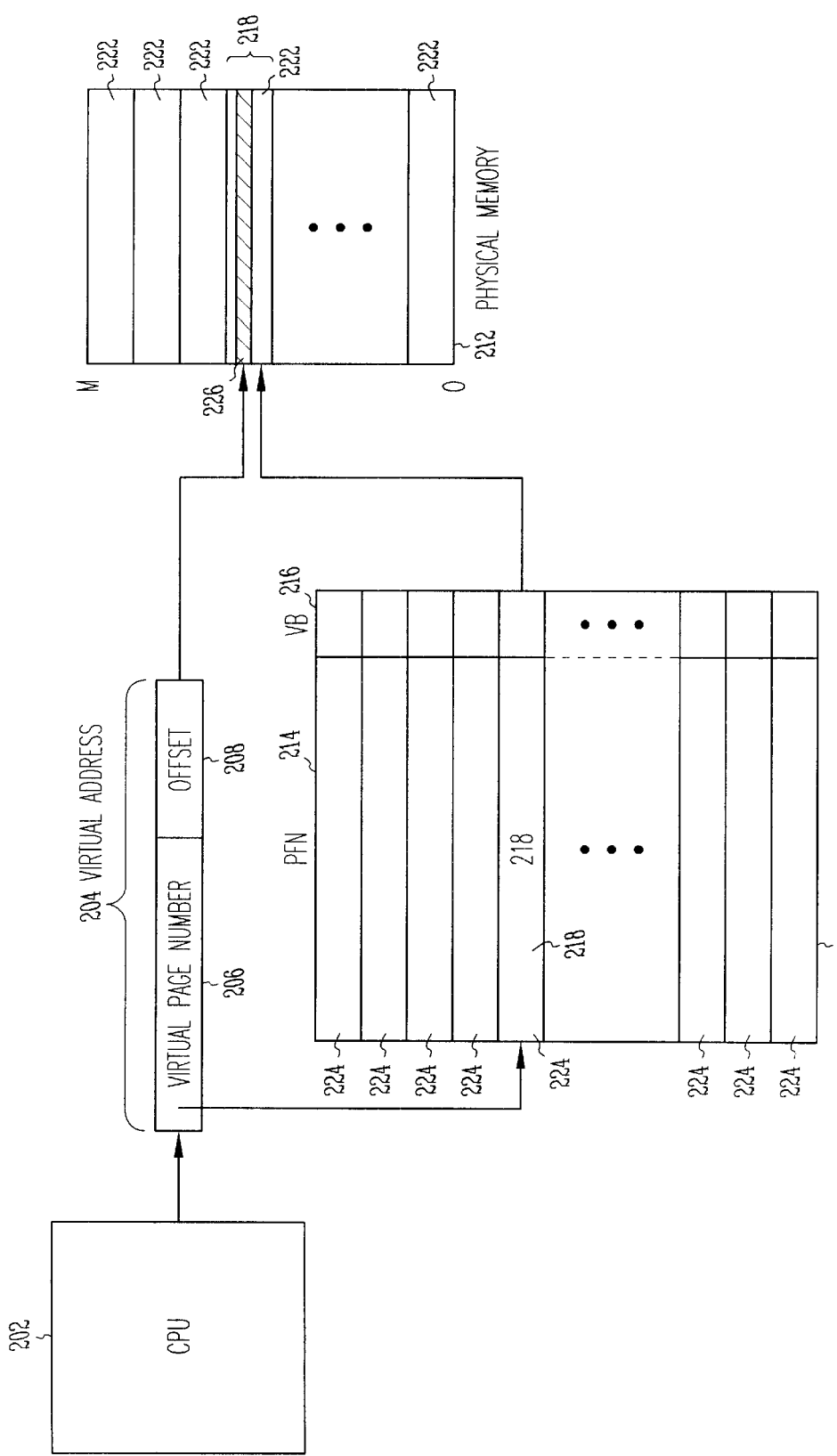
FIG. 2 illustrates a schematic diagram of an exemplary method for translating a virtual address to a physical address via a page table.

FIG. 2 illustrates a schematic diagram of an exemplary method for translating a virtual address 204 to a physical address 226 via a page table 210. The virtual address 204 includes two fields: a virtual page number 206 and an offset 208. A physical memory 212 stores a plurality of physical pages 222. The page table 210 includes a plurality of page table entries 224 with one entry per virtual page. Each page table entry 224 includes a physical page number 214 and a valid bit 216 for mapping a virtual page to a physical page. In addition, page table entries may include a variety of other bits and fields as will be described below in more detail.

The valid bit 216 is used to indicate whether the physical page number in the corresponding page table entry is valid. If bit 216 is valid, then the physical page number in the corresponding page table entry is used as the physical page number in the physical memory 212. This means that the physical page is in the physical memory 212. If bit 216 is invalid, then a page fault may be generated to load the corresponding physical page into the physical memory 212 before mapping the virtual address to the physical memory. In this process, the page table entry associated with the new physical page is updated. It should be appreciated that a variety of techniques for performing page faults is known in the art.

In this arrangement, a processor 202 generates the virtual address 204 in a thread's virtual address space. The virtual page 206 is used as an index to obtain a physical page number (e.g., page frame number) 218 from the page table. On the other hand, the offset 208 is used to find the exact physical address 226 by providing the offset from the physical page number. Thus, the physical address 226 corresponding to the virtual address 204 is obtained by adding the offset 208 and the physical page number 218 obtained from the page table 210.

Figure 3:
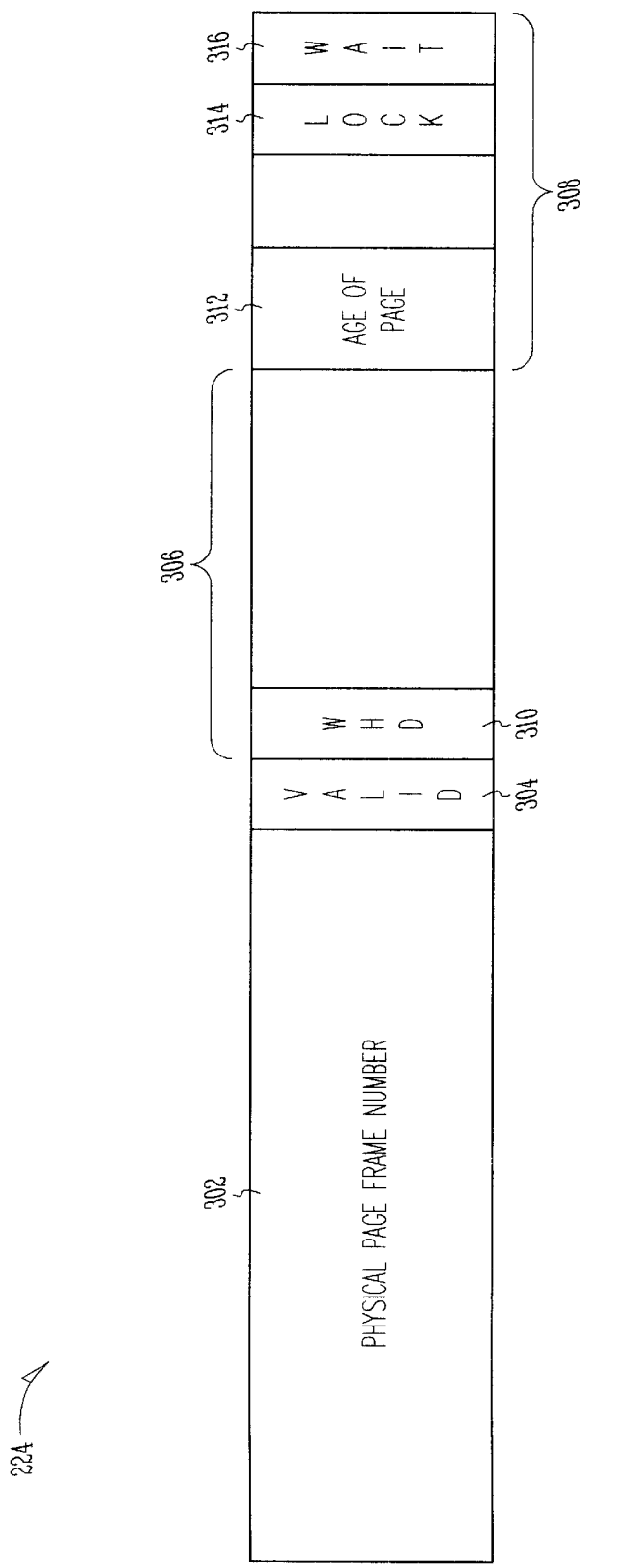
FIG. 3 shows a more detailed diagram of an exemplary page table entry in accordance with one embodiment of the present invention.

FIG. 3 shows a more detailed diagram of an exemplary page table entry 224 in accordance with one embodiment of the present invention. The page table entry 224 includes a physical page frame number (PFN) field 302, a valid bit field 304, a hardware bit field 306, and a software bit field 308. Although the page table entry 224 is illustrated as having such fields, the present invention may employ any suitable fields and bits in the page table entry 224 in accordance with the hardware requirements of specific computer systems. For example, the optional hardware and software bit fields 306 and 308 may be used to store various information such as housekeeping bits, flags, etc.

The physical page frame number field 302 includes a physical page frame number that corresponds to the physical page frame number in the physical memory (e.g., RAM, DRAM, SDRAM, SRAM, etc.). For example, if a thread references a virtual page number ten, then the virtual memory system locates the page table entry corresponding to the virtual page number ten. Then, the virtual memory system checks to see whether the valid bit indicates that the physical page frame number in the entry is valid, which means that the physical page is present in the physical memory. If valid, then the virtual memory system uses the physical page frame number in the located page table entry for translating the virtual address to a physical address. To accelerate the translation process, the virtual memory system also may implement a well-known translation lookaside buffer (TLB) in one embodiment.

In contrast, if the valid bit indicates that the physical page frame in the located entry is not valid, then a page fault can be generated to load the page from a secondary storage device. When the new page frame is loaded into the physical memory, the physical page frame number field is also updated with the new physical page number. Simultaneously, the valid bit is set to indicate that the physical page frame in the physical memory is valid.

Modern operating systems (e.g., UNIX and LINUX™ operating systems) typically provide the hardware and software bit fields 306 and 308 in the page table entry 224 to store additional information that are used to facilitate address translation. For example, the hardware bit field 306 may include a write permission bit 310 (WHD), which is used to indicate whether data may be written to the associated page. The write permission bit 310 is essentially a modify or dirty bit. When the write permission bit 310 is set, a user program may perform a store operation to the associated virtual address. Otherwise, the operating system generates a trap when the write permission bit 310 is not set. The hardware bit field 306 may include other information that keeps track of hardware-related information.

The software bit field 308, on the other hand, is used to store a variety of housekeeping data bits. For example, the software bit field 308 may keep track of how long a page has been in the physical memory by including a well-known age-of-page bit field 312 to facilitate page out operations. The software bit field 308 also may include other well-known information to assist the virtual memory system in performing address translation.

In one embodiment, the present invention also uses a "shadow" page table when a page table does not have sufficient space to hold desired information. The shadow page table is implemented as a data structure that parallels the page table. The shadow page table may describe, for example, how to find a virtual page when it is not located in physical memory.

In contrast to the conventional methods of providing lock bits in the data structure of regions or sub-regions, the present invention eliminates the locks from the data structure of the regions and, instead, provides the locks in the page table itself. For example, the page table entry 224 of FIG. 3 includes a pair of fields 314 and 316 in the software bit field 308 in accordance with one embodiment of the present invention. The field 314 is used to store a LOCK bit and the field 316 is used to store a WAIT bit. Although the illustrated embodiment provides the LOCK bit and WAIT bit in the software bit field 308; these bits may be provided in any suitable location in a page table entry such as in the hardware bit field 306.

The LOCK bit is a mutual exclusion bit having two states and indicates whether the associated page is locked to provide exclusive access to a thread. For example, a LOCK state of "0" means that the lock is available for locking the page associated with the lock bit. In contrast, a lock state of "1" indicates that the lock is unavailable for locking since the associated page is already locked. Under this scheme, when a thread needs to perform a paging operation, the virtual memory system locates the page table entry corresponding to that page and uses the lock bit in the page table entry to lock the associated page.

The lock bits are atomically updated by means of well-known atomic operations such as load linked and store conditional and compare-and-swap. Atomic operations are well known in the art and are used to ensure that all operations of a thread upon data are performed completely. If, however, the operations of a thread are not completely performed successfully, then the atomic operations ensure that the data does not reflect the result of the partially performed operations. In essence, the data reverts to the original state as if the operations of the thread were not performed.

The WAIT bit, on the other hand, is an optional bit, which indicates that one or more threads are waiting to acquire the lock to the page associated with the WAIT bit. For example, a WAIT state of "1" means that one or more threads may be waiting to access the page associated with the WAIT bit. A WAIT state of "0" indicates that no threads are waiting to gain access the associated page.

Each of the page tables in the present invention thus provides each page table entry with a lock. That is, one lock is provided for each virtual page. Accordingly, each page table contains a lock for each page in a working set. Furthermore, by using the existing bits in the page table, the present invention need not allocate additional space for the locks, thereby saving a significant amount of space that otherwise would be needed in data structures of regions or sub-regions.

The lock bits in the page table entries also provide a high degree of parallelism in the address spaces without using any additional space. Under this scheme, for example, a thousand threads may gain locks to, and thereby access, a thousand different pages simultaneously. As long as the threads are accessing different pages, they are using different locks and thus are assured of complete parallelism.

However, in the event that two or more threads attempt operations on the same virtual page, the threads are serialized as in a queue to obtain the lock to the page when the lock becomes free. The present invention may implement various well-known priority methods to assign the lock to a thread in such event and place the remaining threads in the queue in accordance with priority. At this time, the WAIT bit is asserted to indicate that one or more threads are in a queue to gain access to the lock.

Figure 4:
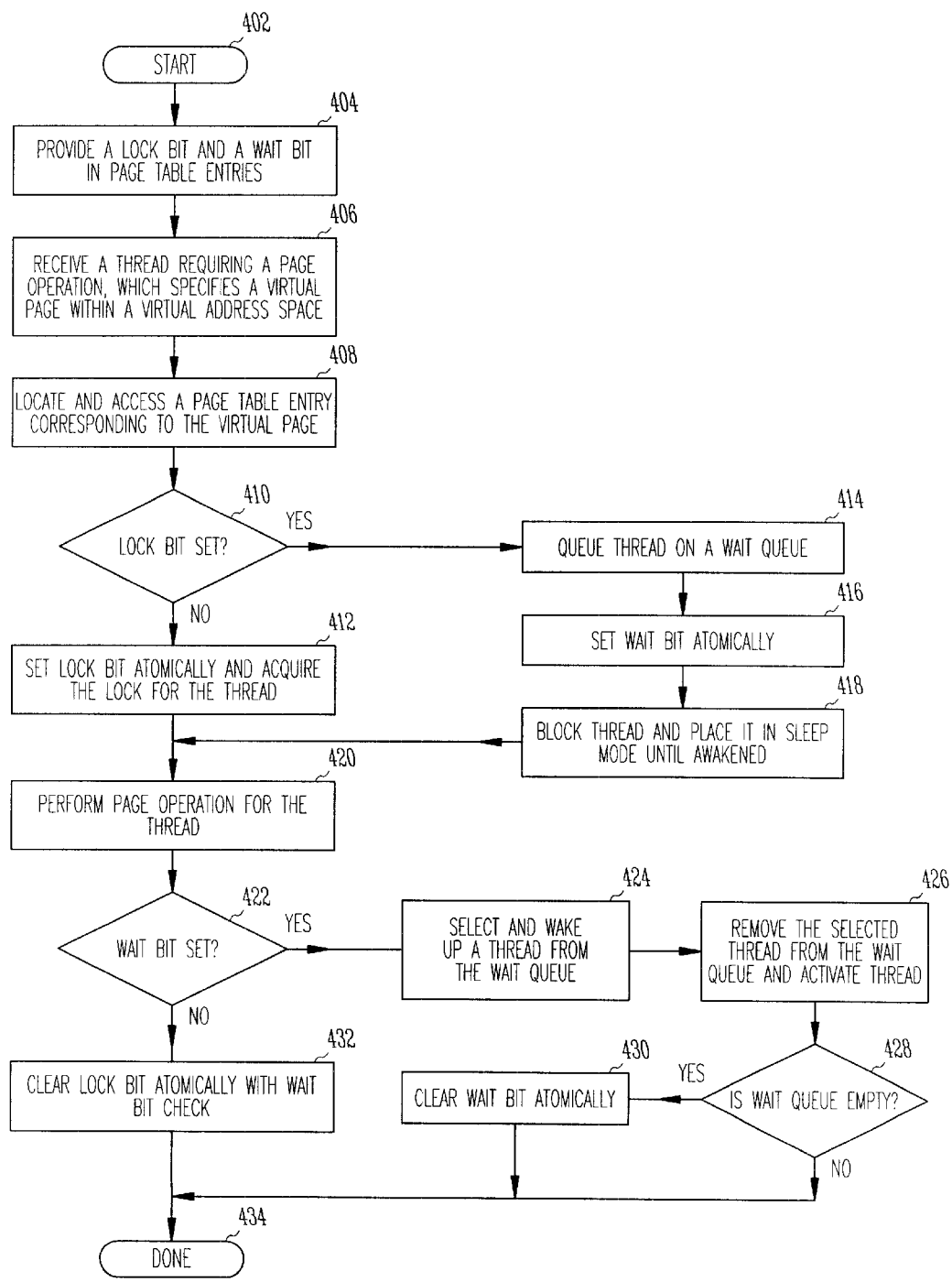
FIG. 4 shows a flowchart of a method for providing concurrent access to a virtual memory data structure by using LOCK and WAIT bits in accordance with one embodiment of the present invention.

FIG. 4 shows a flowchart of a method for providing concurrent access to a virtual memory data structure by using LOCK and WAIT bits in accordance with one embodiment of the present invention. The LOCK bit enables a thread to have mutually exclusive access to the associated page data structure while the WAIT bit is used to place a thread on a wait queue until the LOCK bit is cleared. The method begins in operation 402 and proceeds to operation 404, where a LOCK bit and a WAIT bit are provided in each of the page table entries of a page table. The page table is configured to map virtual pages to physical pages.

In a preferred embodiment, only two bits are needed in each PTE to implement the lock for that page. Because page table entries typically contain a number of bits for use by the operating system, these existing spaces can be used for the LOCK and WAIT bits. In this manner, additional space for the LOCK and WAIT bits need not be allocated. Additionally, the size of the page table entries need not be increased to accommodate the LOCK and WAIT bits. Thus, the use of the existing bits in the page table entries for the LOCK and WAIT bits is highly space efficient.

Although the preferred embodiment uses the WAIT bit, those skilled in the art will readily appreciate that the present invention may employ only the LOCK bit to provide concurrency. For example, the LOCK bit may be used as a spin lock to implement a busy waiting feature. The spin lock is well known in the art and allows a thread to gain access to the lock by waiting in a spin loop until the lock becomes free. Accordingly, a WAIT bit is not needed in such embodiment.

With continuing reference to FIG. 4, in operation 406, a thread requiring a paging operation is received. That is, the thread requires access to the virtual page data structure. The thread has a virtual address including a virtual page frame number for the paging operation. Next, in operation 408, the page table entry corresponding to the virtual page frame number is located and accessed.

After the page table entry has been located, the LOCK bit for the located page table entry is checked, in operation 410, to determine whether it has been set, i.e., is unavailable. If the LOCK bit for the page has not been set and thus is available, then the method proceeds to operation 412, where the lock bit is set atomically so that the thread acquires the lock to ensure mutually exclusive access. However, if the LOCK bit is determined to have been set in operation 410, then the method proceeds to operation 414, where the thread is queued in a wait queue in accordance with any well-known priority algorithm. The wait queue is configured to store a list of threads waiting to obtain the lock for the page associated with the LOCK bit. At any one time, the wait queue may contain one or more threads or it may be empty. Then, the WAIT bit is set atomically in operation 416 to indicate that one or more threads may be waiting in the wait queue. The thread is then blocked and placed in sleep mode, in operation 418, until subsequently selected and awakened.

From operation 412 or 418, the method proceeds to operation 420, where the thread is executed. That is, the operations of the thread are performed by accessing the virtual page data structure associated with the page table entry. When all operations for the thread have been completed, it is determined, in operation 422, whether the WAIT bit has been set to indicate that one or more threads are waiting in a wait queue for the lock. If the WAIT bit has not been set, then the LOCK bit is cleared atomically with wait bit check in operation 432.

On the other hand, if the WAIT bit has been set, then a thread is selected from the wait queue and awakened from sleep mode in operation 424. In selecting a thread from the wait queue, any well-known algorithm such as FIFO, LIFO, a priority-based algorithm, or the like may be employed. In operation 426, the selected thread is then removed from the wait queue and activated. The removal of the selected thread reduces the number of threads in the queue by one.

Upon removing and activating the selected thread, it is determined in operation 428 whether the wait queue is empty. If the wait queue is empty, then the WAIT bit is cleared atomically in operation 430. After clearing the LOCK bit or after activating a waiting thread, the method terminates in operation 434.

The use of a lock bit in each of the page table entries allows efficient automatic scaling because the amount of page table space is proportional to the amount of the virtual address space of the region that is actually in use. For example, a large but sparse region has a correspondingly small page table, which prevents wasting space for locks for virtual pages that may not be referenced. Similarly, if a large region is paged out, then the page tables can also be freed, thereby releasing the memory for the locks as well. Accordingly, the number of page locks available scales exactly with the number of virtual pages actually used in the region.

Figure 5:
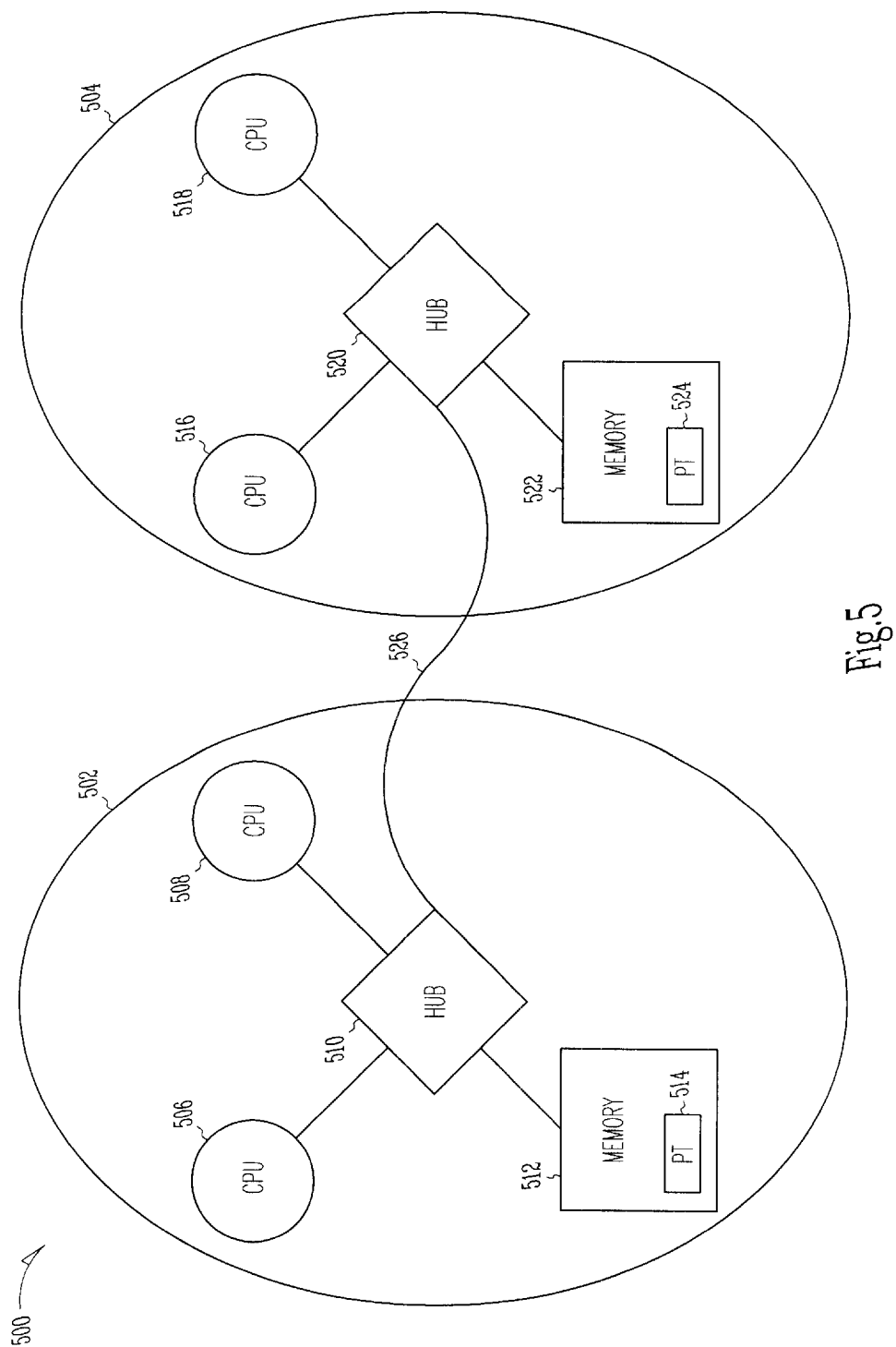
FIG. 5 shows an exemplary distributed memory system that implements locks in page tables in accordance with one embodiment of the present invention.

The present invention provides significant advantages in a variety of computer systems such as multi-processor systems, distributed shared memory systems, etc. For example, FIG. 5 shows an exemplary distributed memory system 500 that implements locks in page tables 514 and 524 in accordance with one embodiment of the present invention. The DSM system 500 includes a pair of nodes 502 and 504 coupled to one another by means of an interconnect 526. Each node includes a plurality of CPUs, a memory, and a hub. Specifically, the node 502 includes a pair of CPUs 506 and 508, a hub 510, and a memory 512. The memory and CPUs 506 and 508 are coupled to the hub 510. A page table 514 having lock and wait bits resides in the memory 512. Similarly, the node 504 includes a pair of CPUs 516 and 518, a hub 520, and a memory 522. The memory 522 is arranged to store a page table 524, which includes lock and wait bits in the entries thereof. Although the DSM system 500 is illustrated as having nodes 502 and 504, with each node having a pair of CPUs, those skilled in the art will appreciate that the system may include any number of nodes and CPUs.

The DSM system 500 distributes or shares memory across the nodes instead of having a single memory unit. In this arrangement, portions of memory can be distributed in the memories 512 and 522 for access to both nodes 502 and 504. The memory distribution means that accessing a local memory in the same node is faster than accessing a memory in another node. As such, memory access is often non-uniform depending largely on the location of a memory with respect to a node.

In the DSM system, the kernel of the operating system functions to allocate page tables close to the CPUs using the associated portion of the virtual address space. This allows different portions of a page table to be located in different nodes to achieve good locality. Hence, the locks are also local to the threads that use them the most. Accordingly, the number of remote memory references is substantially reduced in the DSM system 500 by keeping portions of the address space and a page table with the locks in the node where the threads are executed. By way of example, the page table 514 with the locks in the local memory 512 provides locality to threads from the CPUs 506 and 508, thereby improving performance substantially. In particular, kernel data structures may be placed in the local memory 512 to provide faster access to threads running on the CPUs 506 and 508 on the node 502.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer system with a plurality of processors including a first and second processor, a method for managing concurrent access to virtual memory data structures, the method comprising:

providing a lock bit for locking a virtual page data structure, said lock bit being provided in a page table entry of a page table, which is configured to map virtual pages to physical pages;

receiving, at the first processor, a first thread that specifies an operation on said virtual page data structure; setting said lock bit in said page table entry such that said first thread is granted exclusive access to said virtual page data structure and that other threads are prevented from accessing said virtual page data structure; and executing the first thread on the second processor, wherein the first thread retains exclusive access to said virtual page data structure.

2. The method as recited in claim 1, further comprising:

clearing said lock bit when said first thread no longer needs access to said virtual page data structure such that a second thread selected from said other threads may acquire exclusive access to said virtual page data structure by setting said lock bit in said page table entry.

3. The method as recited in claim 2, wherein said other threads are placed in a spin loop to wait for said lock bit to become available.

4. The method as recited in claim 2, further comprising:

providing a wait bit in said page table entry of said page table to indicate that one or more threads are waiting to gain access to said virtual page data structure, wherein said other threads are placed in said wait queue when said first thread has exclusive access to said virtual page data structure.

5. The method as recited in claim 1, wherein said page table is implemented as a first data structure, the method further comprising:

using a shadow page table to provide said page table with additional space to enable said page table to implement said lock bit, said shadow page table having a data structure that resembles said first data structure of said page table.

6. The method as recited in claim 1, wherein said page table is arranged to accommodate a plurality of page table entries for accessing a plurality of virtual page data structures, each page table entry capable of having said lock bit for locking an associated virtual page data structure, and wherein said page table provides said lock bits for only those page table entries that are actually in use such that the number of said lock bits scales with the number of said virtual page data structures.

7. The method as recited in claim 6, wherein each page table entry has its own lock bit so as to provide a substantially fine lock granularity.

8. The method as recited in claim 1, wherein said operation of providing exclusive access to said first thread comprises:

determining if said lock bit has been set to indicate that said virtual page data structure is locked such that said first thread is prevented from accessing said virtual page data structure; and if said lock bit has not been set, acquiring said lock bit for said first thread by setting said lock bit; or if said lock bit has been set, waiting until said lock bit becomes available for said first thread to access said virtual page data structure.

9. The method as recited in claim 8, wherein said operation of providing exclusive access to said first thread comprises:

accessing, by said first thread, said virtual page data structure to perform said operation; and clearing said lock bit atomically.

10. The method as recited in claim 8, wherein the operation of waiting until said lock bit becomes available comprises:

providing a wait bit in said page table entry of said page table to indicate that one or more threads are waiting to access said virtual page data structure;

atomically setting said wait bit; and blocking said first thread and placing said first thread in a sleep mode until awakened.

11. The method as recited in claim 10, wherein the operation of waiting until said lock bit becomes available comprises:

determining if said wait bit has been set to indicate that said one or more threads are waiting to access said virtual page data structure; and if said wait bit has not been set, clearing said lock bit atomically; or if said wait bit has been set, activating a specified thread among said one or more threads to provide exclusive access to said virtual page data structure.

12. The method as recited in claim 11, wherein said one or more threads are placed in a wait queue, wherein the operation of activating said specified thread further comprises:

selecting and activating said specified thread;

determining if said wait queue is empty; and clearing said wait bit atomically if said wait queue is empty.

13. The method as recited in claim 1, wherein the computer system is a distributed shared memory system having a plurality of nodes, each node having a set of CPUs, a memory, and a hub.

14. The method of claim 1, wherein the page table is implemented in a virtual page data structure.

15. A method for providing concurrent access by a plurality of processors including a first and second processor to a virtual page data structure in a memory system, comprising:

providing a lock bit for locking a virtual page data structure, said lock bit being provided in a page table entry of a page table capable of having a plurality of page table entries; and setting said lock bit in said page table entry such that a first thread running in said first processor is granted exclusive access to said virtual page data structure and that other threads are prevented from accessing said virtual page data structure;

executing the first thread on the second processor, wherein the first thread retains exclusive access to said virtual page data structure; and clearing said lock bit when said first thread has completed access to said virtual page data structure such that a thread selected from said other threads sets said lock bit to acquire exclusive access to said virtual page data structure.

16. The method as recited in claim 15, wherein said other threads are placed in a spin loop to wait for said lock bit to become available.

17. The method as recited in claim 15, further comprising:

providing a wait bit in said page table entry of said page table to indicate that one or more threads are waiting to gain access to said virtual page data structure.

18. The method as recited in claim 15, wherein said other threads are placed in a wait queue when said virtual page data structure is not accessible and wherein said selected thread is activated when said first thread has completed accessing said virtual page data structure.

19. The method of claim 15, wherein the page table is implemented in a virtual page data structure.

20. A method for locking a virtual memory data structure that is accessible by a plurality of processors including a first and second processor via a page table having a plurality of page table entries, with each page table entry including a physical page number, a valid bit, and a set of miscellaneous bits, the method comprising:

defining a first bit of said miscellaneous bits in said page table entry as a lock bit; and using said lock bit to provide mutually exclusive access to a virtual page data structure associated with said lock bit in response to a first thread executing in the first processor while preventing other threads from accessing said virtual page data structure; and executing the first thread on the second processor, wherein the first thread retains exclusive access to said virtual page data structure.

21. The method as recited in claim 20, wherein said operation of using said lock bit further comprises:

setting said lock bit in response to said first thread; and clearing said lock bit when said first thread has completed accessing said virtual page data structure.

22. The method as recited in claim 21, further comprising:

defining a second bit of said miscellaneous bits in said page table entry as a wait bit; and using said wait bit to indicate that one or more of said other threads are in a wait queue when said first thread has exclusive access to said virtual page data structure.

23. The method as recited in claim 22, wherein said other threads in said wait queue are placed in a sleep mode, and wherein a second thread is selected from among said other threads and is activated when said first thread no longer needs exclusive access to said virtual page data structure.

24. The method of claim 20, wherein the page table is implemented in a virtual page data structure.

* * * * *